(12) United States Patent
Yoshikawa et al.

(10) Patent No.: US 7,683,518 B2
(45) Date of Patent: Mar. 23, 2010

(54) MOTOR

(75) Inventors: Yuichi Yoshikawa, Osaka (JP); Kiyomi Kawamura, Osaka (JP); Hiroshi Murakami, Osaka (JP); Hideharu Hiwaki, Osaka (JP); Yasushi Kamada, Fukui (JP); Hiroki Sato, Fukui (JP)

(73) Assignee: Panasonic Corporation, Osaka (JP)

( * ) Notice: Subject to any disclaimer, the term of this patent is extended or adjusted under 35 U.S.C. 154(b) by 313 days.

(21) Appl. No.: 11/679,918

(22) Filed: Feb. 28, 2007

(65) Prior Publication Data

US 2008/0203842 A1   Aug. 28, 2008

(51) Int. Cl.
*H02K 1/24* (2006.01)
*H02K 1/22* (2006.01)
*H02K 1/27* (2006.01)

(52) U.S. Cl. .................. 310/216.055; 310/156.53; 310/156.56; 310/156.57

(58) Field of Classification Search ...............
310/156.48–156.49, 156.53, 156.55, 156.56, 310/162, 165, 166, 168, 216, 216.55
See application file for complete search history.

(56) References Cited

U.S. PATENT DOCUMENTS

| | | | |
|---|---|---|---|
| 6,049,153 A * | 4/2000 | Nishiyama et al. ..... | 310/156.53 |
| 6,208,054 B1 * | 3/2001 | Tajima et al. ................. | 310/46 |
| 6,234,767 B1 * | 5/2001 | Takeda et al. ................ | 417/355 |
| 6,369,480 B1 * | 4/2002 | Nishiyama et al. ..... | 310/156.53 |
| 6,525,442 B2 * | 2/2003 | Koharagi et al. ....... | 310/156.48 |
| 6,812,614 B2 * | 11/2004 | Yamamoto et al. .......... | 310/261 |
| 6,847,144 B1 * | 1/2005 | Luo ....................... | 310/156.49 |
| 6,936,945 B2 * | 8/2005 | Murakami et al. ..... | 310/156.56 |
| 6,949,856 B2 * | 9/2005 | Tajima et al. .......... | 310/156.53 |
| 7,417,349 B2 * | 8/2008 | Tajima et al. .......... | 310/156.53 |
| 2005/0229384 A1 * | 10/2005 | Yamamoto et al. ............ | 29/598 |
| 2006/0017345 A1 * | 1/2006 | Uchida et al. .......... | 310/156.56 |

FOREIGN PATENT DOCUMENTS

| | | | |
|---|---|---|---|
| EP | 1610444 A1 | * | 12/2005 |
| JP | 2002-010541 | | 1/2002 |
| JP | 2004343861 A | * | 12/2004 |

* cited by examiner

*Primary Examiner*—Tran N Nguyen
(74) *Attorney, Agent, or Firm*—RatnerPrestia

(57) ABSTRACT

A motor includes a stator formed of a stator iron-core having salient pole iron-cores and windings, and a rotor having a rotor iron-core in which permanent magnets are buried. A magnetic pole centerline connecting a rotary center of the rotor to a magnetic pole center crosses an external shape of the rotor iron-core at end point X, and the magnetic-pole boundary line connecting the rotary center to a magnetic pole boundary point crosses the external shape of the rotor iron-core at end point Z. A straight line angled at a given angle θa from the magnetic pole centerline has end point A. Then a sectional view of the rotor iron-core shows an arc drawn between the end points X and A, and the arc's center is the rotary center. The end points A and Z are connected by one or more than one straight lines in series.

8 Claims, 10 Drawing Sheets

MOTOR

FIELD OF THE INVENTION

The present invention relates to a motor to be used as a synchronous motor or a brushless motor, and the motor is an interior magnet type motor in which permanent magnets are buried in the rotor.

BACKGROUND OF THE INVENTION

A conventional interior magnet motor has employed a structure where an external shape of each one of poles of the rotor shapes like a curve of hyperbolic function in order to output greater torque and reduce the inductance. This structure is disclosed, e.g. in Unexamined Japanese Patent Publication No. 2002-10541.

This conventional structure of the rotor is shown in FIG. 8, which shows a sectional view of the rotor. Rotor iron core 53 fastens rotary shaft 52 at its center, and permanent magnets 51 are buried at its periphery. Each one of the poles is marked with "L" in FIG. 8, and its external shape "F" forms the curve of hyperbolic function, and this curve is linked to each other in series equal to the number of poles in total, thereby forming the external shape of the rotor.

A top of each one of the poles forms an arc, and lateral face 62 continued from the top forms a slope inwardly (toward the center) from the extension line of the arc. A space between top 61 and the stator (not shown) is small, so that the motor outputs greater torque; however, a space between lateral face 62 and the stator is greater, thereby producing smaller inductance. BEMF (back electromotive force) at a high rpm becomes smaller at a smaller inductance, so that the torque at the high rpm advantageously increases. The smaller inductance also saves energy proportionately.

On the other hand, there is a motor of which magnetic path is enlarged for lowering the inductance so that greater torque can be produced. Such a motor encounters greater cogging torque, and its induction voltage waveform strays off the sine-wave, so that the harmonic content increases. The rotor's external shape formed of the hyperbolic function curve causes the cogging torque to increase in response to a change of a tip-shape of the salient pole of stator's iron core, so that the harmonic content of the induction voltage increases.

FIG. 9 shows a waveform of an induction voltage of two poles, i.e. 360° in electrical angles. In FIG. 9, X-axis represents a rotary angle, and Y-axis represents an induction voltage. The solid line shows actual measured values, and the broken line shows an ideal sine-waveform. Harmonics of the values actually measured shown in FIG. 9 are analyzed, and induction voltages at respective harmonics are obtained as shown in FIG. 10. These drawings tell that the induction voltage shows distorted waveform from the ideal sine-waveform, and the harmonic content increases.

SUMMARY OF THE INVENTION

A motor of the present invention includes the following elements:

a stator including a stator iron core formed of a salient pole iron-core and a yoke, the stator iron core on which windings are wound; and a rotor having a rotor iron core formed by laminating thin iron-sheets of high magnetic permeability, and held rotatably facing the inner wall of the salient pole iron-core via space.

The rotor iron-core has a plurality of holes in which permanent magnets are buried. Assume that the following three end points X, Z and A are formed: The magnetic pole centerline connecting a rotary center of the rotor to a magnetic pole center crosses an external shape of the rotor iron-core at end point X, and a magnetic-pole boundary line connecting the rotary center to a magnetic pole boundary point crosses the external shape of the rotor iron core at end point Z. A straight line angled at a given angle θa from the magnetic pole center line toward the magnetic boundary line and extending through the rotary center crosses the external shape of the rotor iron-core at end point A. Then a sectional view of the rotor iron-core shows an arc drawn between the end points X and A, and the arc's center is the rotary center. The end points A and Z are connected by one or more than one straight lines in series, and the straight lines exist inside the circle drawn by an extension line of the arc at the same curvature.

The foregoing structure allows the motor of the present invention to lower the cogging torque as well as the harmonic content in the induction voltage, and achieves an interior-magnet motor of which vibrations and noises are suppressed.

DETAILED DESCRIPTION OF PREFERRED EMBODIMENT

Exemplary embodiments of the present invention are demonstrated hereinafter with reference to the accompanying drawings.

Exemplary Embodiment 1

Figure 1:
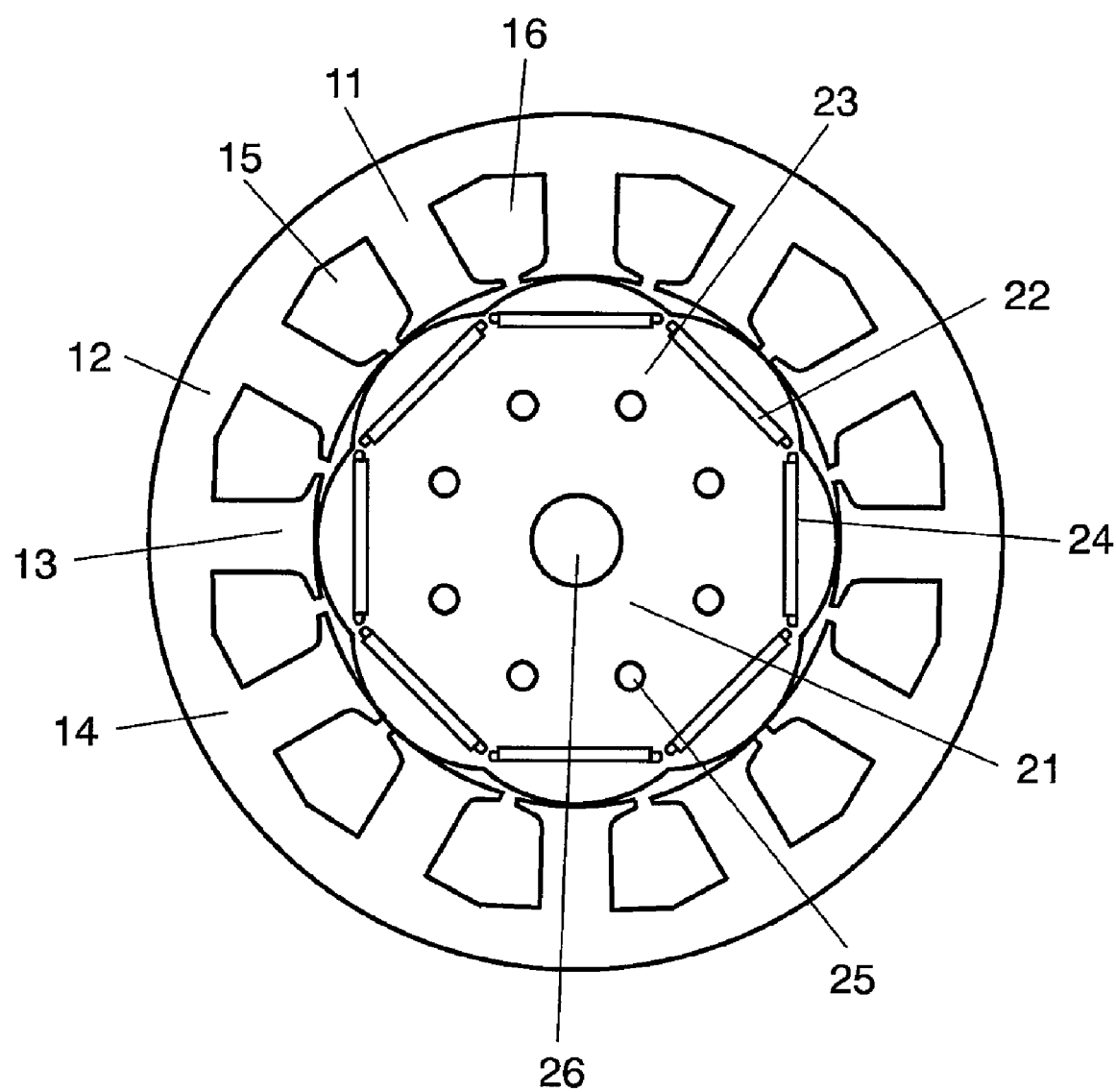
FIG. 1 shows a sectional view of a motor in accordance with a first embodiment of the present invention.

FIG. 1 shows a sectional view of a motor in accordance with the first embodiment of the present invention. In FIG. 1, stator 11 comprises stator iron-core 14 on which windings 16 are wound. Iron-core 14 is formed by press-punching a plurality of highly permeable iron sheets and laminating the sheets punched out. Iron-core 14 includes yoke 12, salient pole iron-cores 13 and slots 15 formed between adjacent salient pole iron-cores 13. Windings 16 are wound on stator iron-core 14 in a concentrated winding manner, and windings 16 are housed in slots 15.

Rotor 21 comprises rotor iron-core 23, permanent magnets 24 buried in holes 22, and end plates (not shown) rigidly mounted on both the ends of iron-core 23 with crimping pins 25. Iron core 23 is formed by laminating along the axial direction a plurality of highly permeable iron sheets having holes 22 in which permanent magnets to be buried. Rotary shaft 26 is rigidly mounted at the center of iron core 23, and iron core 23 is rotatably supported by a bearing (not shown). Rotor 21 thus formed faces the inner wall of salient pole iron-cores 13 via a space in between.

In FIG. 1, rotor 21 has 8 poles (4 pairs of poles), and stator 11 has 12 slots; however, the present invention is not limited to this combination, and other combinations are applicable to the present invention.

Figure 2:
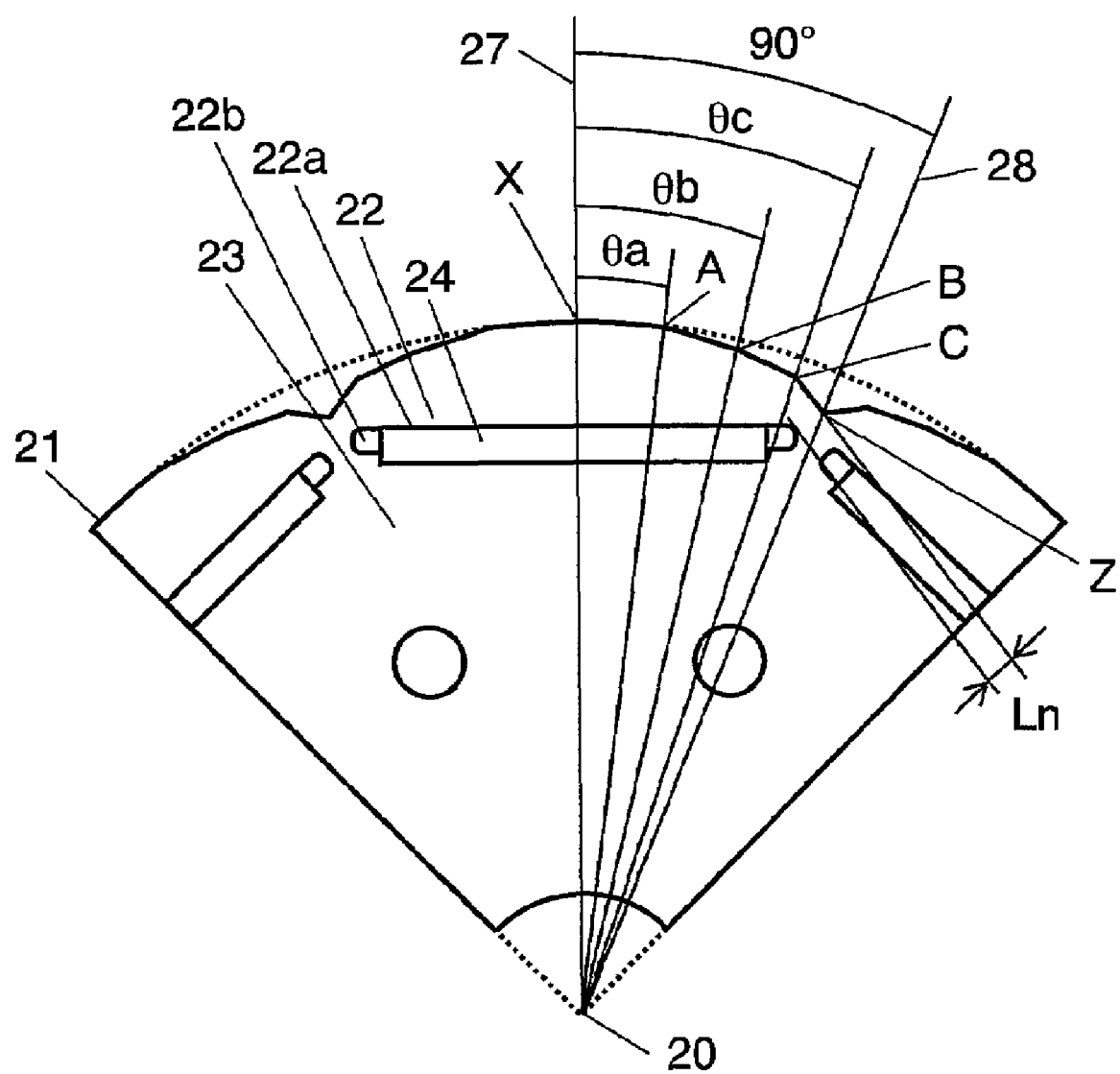
FIG. 2 shows a sectional view of an essential part of the rotor of the motor in accordance with the first embodiment of the present invention.

FIG. 2 shows a sectional view illustrating an essential part of rotor 21 of the present invention. In FIG. 2, each one of holes 22 for accepting magnets includes rectangular hole 22a slightly larger than the cross section of the permanent magnet to be buried therein and projections 22b, provided along the circumferential direction, to both the ends of hole 22a. Projection 22b has a length along the radial direction shorter than the length of rectangular hole 22a along the radial direction, so that the magnet inserted in hole 22a can be prevented from slipping into projection 22b. Since the magnet can be positioned by rectangular hole 22a and projections 22b, the magnet needs not to be fixed in hole 22a by adhesive. Projection 22b forms a cavity working as adhesive reservoir, and prevents the magnetic flux from shorting to the adjacent permanent magnet.

The shape of rotor iron-core 23 is described hereinafter. Magnetic pole centerline 27 connecting rotary center 20 of rotor 21 to the center of permanent magnet 24 crosses the external shape of rotor iron-core 23 at end point X, and magnetic-pole boundary line 28 connecting rotary center 20 to the midpoint between the adjacent permanent magnets crosses the external shape of rotor iron core 23 at end point Z. Magnetic pole centerline 27 and magnetic-pole boundary line 28 include an angle of 90° in electrical angles.

This end point Z is defined this way: assume that min. distance "Ln" is measured between the end of hole 22 and straight line C-Z (detailed later) forming the external shape of rotary iron-core 23 in part, and one sheet of highly permeable iron sheets forming iron-core 23 has thickness "d", then the relation of d/2<Ln<2d is established. Assume that min. distance "Ln" is not greater than "d/2", then it becomes difficult to press and punch the iron sheets, and the mechanical strength of rotor iron-core 23 lowers substantially. To the contrary, assume that min. distance "Ln" is not less than "2d", then output torque decreases substantially because the magnetic flux interlinking the coil is reduced. An amount of leakage flux drawn between the adjacent permanent magnets increases at greater "Ln", so that an increment of the magnetic flux cannot interlink the stator. The foregoing discussion proves that min. distance "Ln" falling within the range discussed above is an optimum one, and the end of hole 22 for determining min. distance "Ln" to the external shape of iron-core 23 is, namely, the end of projection 22b closest to the external shape.

A straight line angled at given angle "θa" from magnetic pole center line 27 toward magnetic boundary line 28 and extending through rotary center 20 crosses the external shape of rotor iron-core 23 at end point A. Then end point X is connected to end point A with an arc of which center is rotary center 20. This given angle "θa" falls within the range of 15°<θa<75° in electrical angles. More preferable range is 15°<θa<60°.

Next, end point A is connected to end point Z with a plurality of straight lines in series. In this embodiment, three straight lines (line A-B, line B-C, and line C-Z) in series are used. End point B is located on the line angled at "θb" from magnetic pole centerline 27. End point C is located on the line angled at "θc" from magnetic pole centerline 27. As discussed above, the external shape of rotor iron-core 23 is drawn with the arc spanning from end point X, at which magnetic pole centerline crosses, to end point A, and then drawn with three straight lines in series between end point A and end point B, between end point B and end point C, and between end point C and end point Z. Angle "θa" represents an electrical angle at the highest voltage (absolute value) point (point "a" shown in FIG. 9) among the intersection points of the ideal waveform (broken line) and the induction voltage waveform (solid line) of the conventional rotor. Angle "θc" represents an electrical angle at the lowest voltage (absolute value) point "c". Angle "θb" represents mid point "b" between the highest voltage point "a" and the lowest voltage point "c".

At this time, the shapes of end points B and C are protrusion, and the respective points include angles not greater than 180°. This structure allows establishing the relation Lb<Lc<Lz, where "Lb" is a distance from the circle (shown in a broken line in FIG. 2) extended from arc X-A at the same curvature to end point B, "Lc" is a distance from the circle to end point C, and "Lz" is a distance from the circle to end point Z. In other words, the space between the external shape of rotor iron-core 23 and the inner wall of the salient iron core of the stator increases at greater distances from magnetic pole centerline 27.

Next, the reason why angle "θa" included between magnetic pole centerline 27 and end point A is set falling within the range of 15°<θa<60° is described hereinafter with reference to FIG. 3, which shows a graph illustrating a relation between output torque, cogging torque and the external shape of the rotor. The X-axis represents a position of end point "A" at electrical angle 180° for one pole. The Y-axis represents a ratio of output torque vs. cogging torque at end point "A" assuming that the output torque and the cogging torque stand at 100 in the condition where the entire external circumference is a circle (end point "A" includes 90° in electrical angles).

Figure 3:
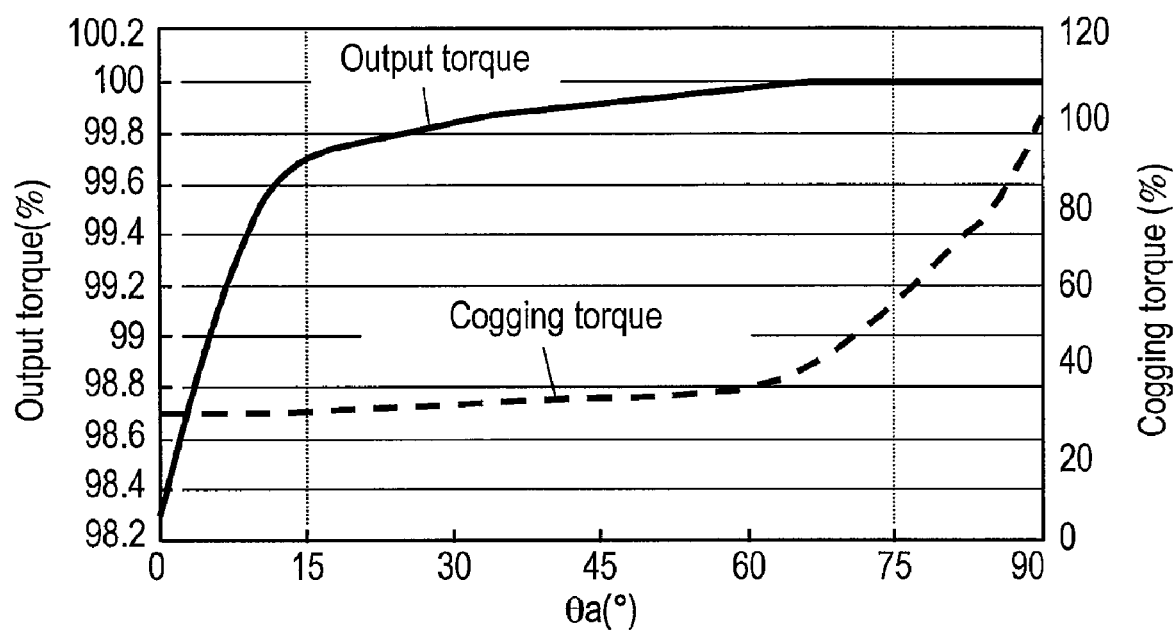
FIG. 3 shows a graph illustrating a relation between output torque, cogging torque and angle "θa" of the motor in accordance with the first embodiment of the present invention.

FIG. 3 tells that angle "θa" not greater than 15° reduces an amount of magnetic flux interlinking the coil, thereby lowering the output torque, and angle "θa" over 75° increases the cogging torque sharply. Thus angle "θa" included between the magnetic pole centerline 27 and end point A desirably falls within the range of 15°<θa<75° in electrical angles, and more preferably falls within the range of 15°<θa<60°.

Figure 4:
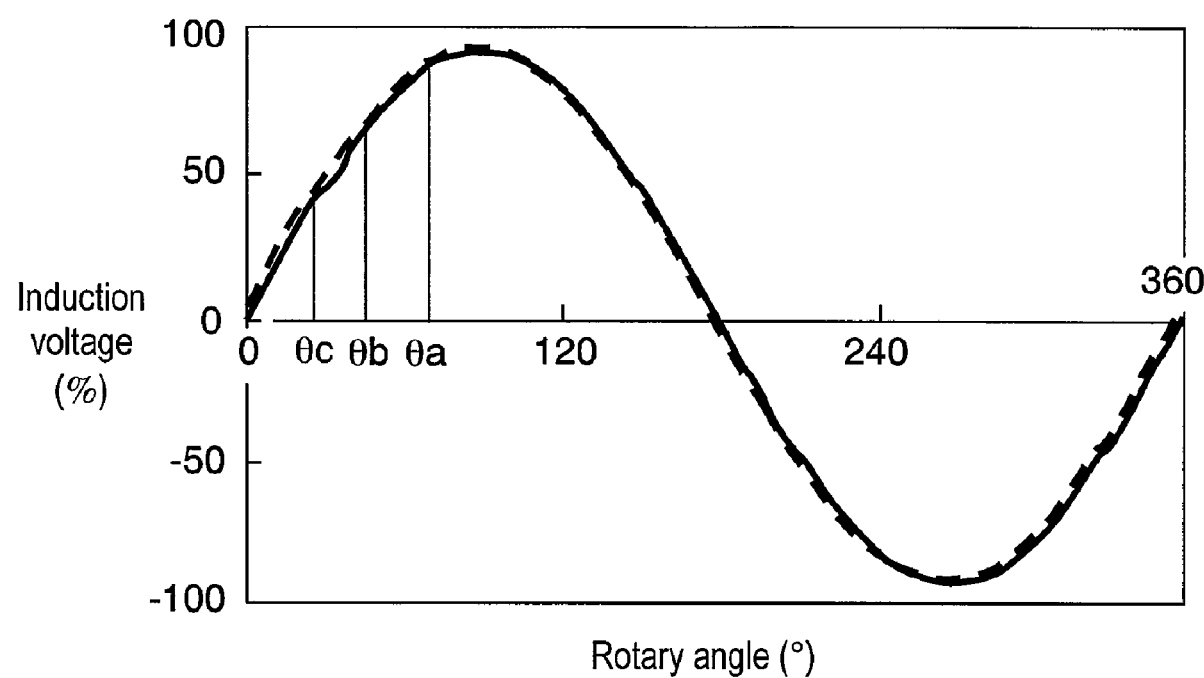
FIG. 4 shows a waveform of induction voltage of the motor in accordance with the first embodiment of the present invention.
Figure 5:
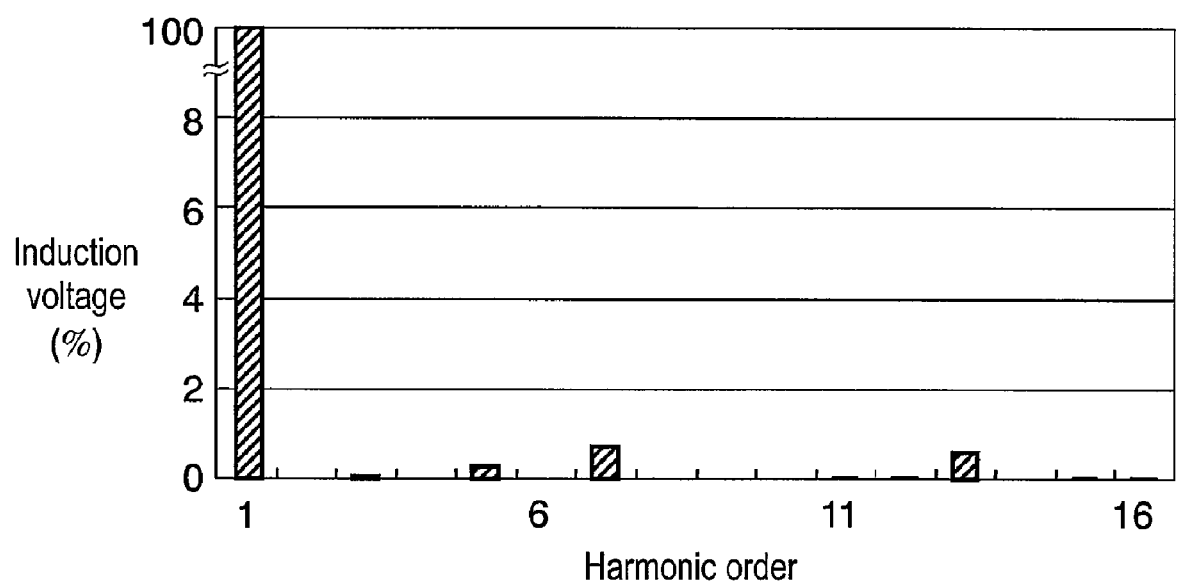
FIG. 5 shows an induction voltage at respective harmonics based on the analysis of actually measured values in FIG. 4.

FIG. 4 shows a waveform of the induction voltage for two poles, i.e. 360° in electrical angles of the motor in accordance with the first embodiment. The X-axis represents a rotary angle, and the Y-axis represents an induction voltage. The solid line shows values actually measured, and the broken line shows an ideal sine waveform. FIG. 5 shows an induction voltage at respective harmonics based on the analysis of the values actually measured in FIG. 4. The relation between the induction voltages and the harmonics shown in FIG. 5 is substituted into equation (1) below, thereby finding harmonic content (ε)=1.6% by calculation. Another harmonic content (ε)=approx. 9% is calculated based on the relation between the induction voltage and the harmonics of the conventional structure shown in FIG. 9. Thus the harmonic content is improved substantially.

$$\varepsilon = \sqrt{\frac{\left(\sum_{n=0}^{\infty} V(n)\right)^2}{(V(1))^2}} \times 100 \qquad (1)$$

As discussed above, this first embodiment proves that the setting of angle "θa" within the range of 15°<θa<60° allows lowering the cogging torque while the output torque is maintained.

In this embodiment, three straight lines in series are used, namely, straight lines connecting respective end points A, B, C and Z. However, the number of straight lines is not limited to three, for instance, end point C can be omitted, and end point B is connected to end point Z by a straight line, so that two straight lines in series work adequately. In this case, the greater harmonic content of the induction voltage than the present case can be expected. To the contrary, another end point D is provided between end points C and Z, and points C and D as well as points D and point Z is connected by a straight line, so that four straight lines in series can be used. The number of straight lines can be further increased. For instance, respective intersection points shown in FIG. 9 of the ideal waveform and the waveform actually measured can be set as end points, or the midpoints between the respective adjacent intersection points can be set as end points in addition to the intersection points. Here is another instance: at the respective intersection points of the ideal waveform and the waveform actually measured, the points showing the maximum difference can be set as end points. In other words, as far as the end points are placed based on a certain rule, any points can be set as end points.

The positions of end points B and C can be changed in response to min. distance "Ln" between the end of magnet hole 22 and the external shape of rotor iron-core 23, thereby reducing the harmonic content of the induction voltage. To be more specific, smaller "Ln" will decrease an amount of leakage flux leaked between the permanent magnets adjacent to each other in iron-core 23. Thus the positions of end points B and C are changed to further inside so that the space between rotor iron-core 23 and stator iron-core 24 can increase for decreasing an amount of magnetic flux interlinking stator iron-core 24. To the contrary, greater "Ln" will increase the amount of leakage flux leaked between the permanent magnets adjacent to each other in iron-core 23. Thus the positions of end points B and C are changed to further outside so that the space between rotor iron-core 23 and stator iron-core 24 can decrease for decreasing an amount of magnetic flux interlinking stator iron-core 24. The harmonic content (ε) can be thus maintained at the minimum value.

The motor in accordance with the first embodiment thus can lower the cogging torque and also lower the harmonic content of the induction voltage, so that the motor of which vibration and noise are suppressed is obtainable.

Exemplary Embodiment 2

Figure 6:
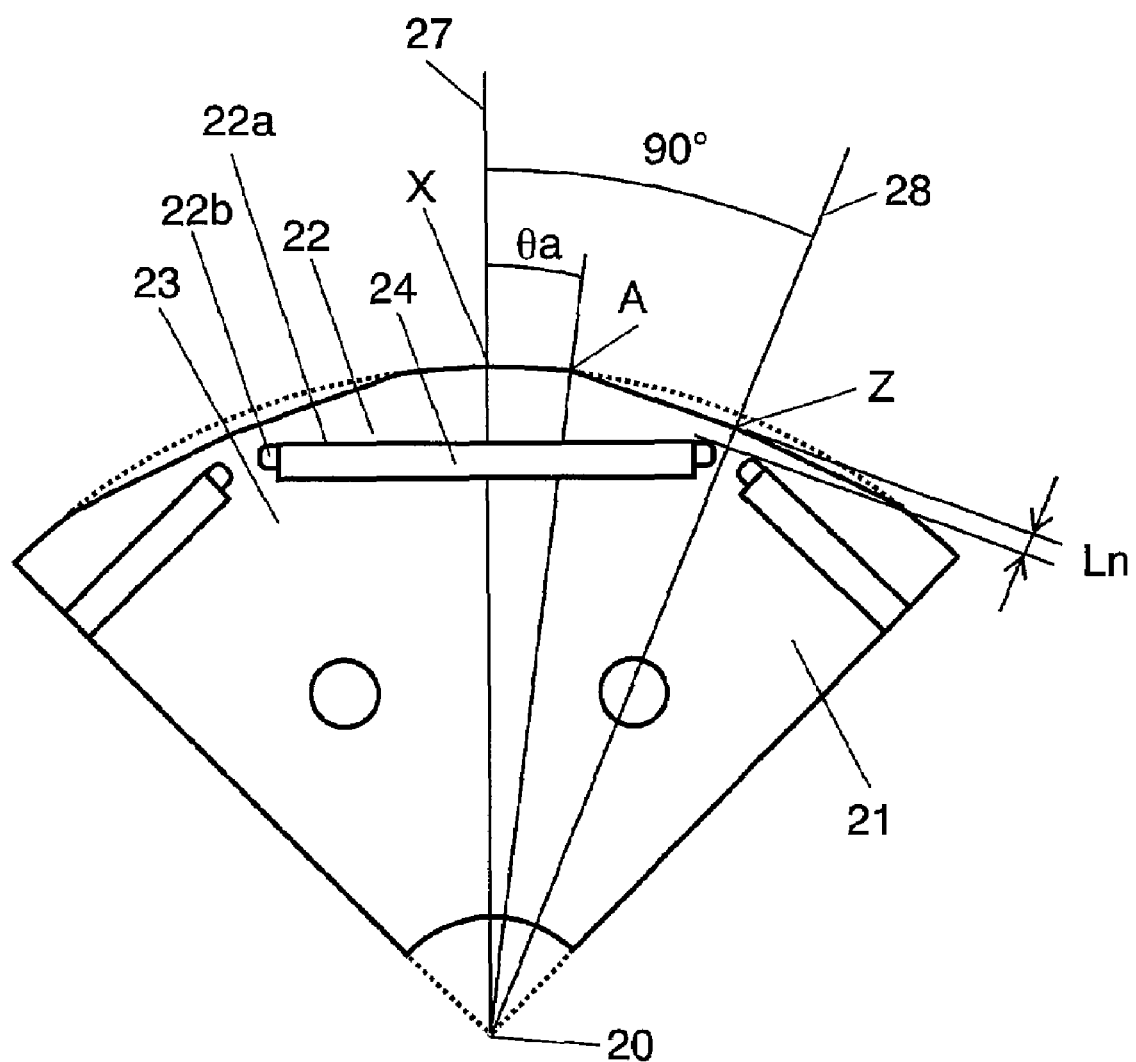
FIG. 6 shows a sectional view of an essential part of the rotor of the motor in accordance with a second embodiment of the present invention.

In the first embodiment discussed above, three straight lines in series span between end points A and Z, thereby forming the external shape in part. In this second embodiment, one straight line spans between end points A and Z, thereby simplifying the external shape. The second embodiment is demonstrated hereinafter with reference to FIG. 6. Similar elements to those in the first embodiment have the same reference marks, and the descriptions thereof are omitted here.

Magnetic pole centerline 27 connecting rotary center 20 of rotor 21 to the center of permanent magnet 24 crosses the external shape of rotor iron-core 23 at end point X, and magnetic-pole boundary line 28 connecting rotary center 20 to the midpoint between the permanent magnets adjacent to each other crosses the external shape of rotor iron core 23 at end point Z. These settings remain unchanged from those in the first embodiment.

This end point Z is defined this way: assume that min. distance "Ln" is measured between the end of hole 22 and straight line A-Z forming the external shape of rotary iron-core 23 in part, and one sheet of highly permeable iron sheets forming iron-core 23 has thickness "d", then the relation of d/2<Ln<2d is established.

Figure 9:
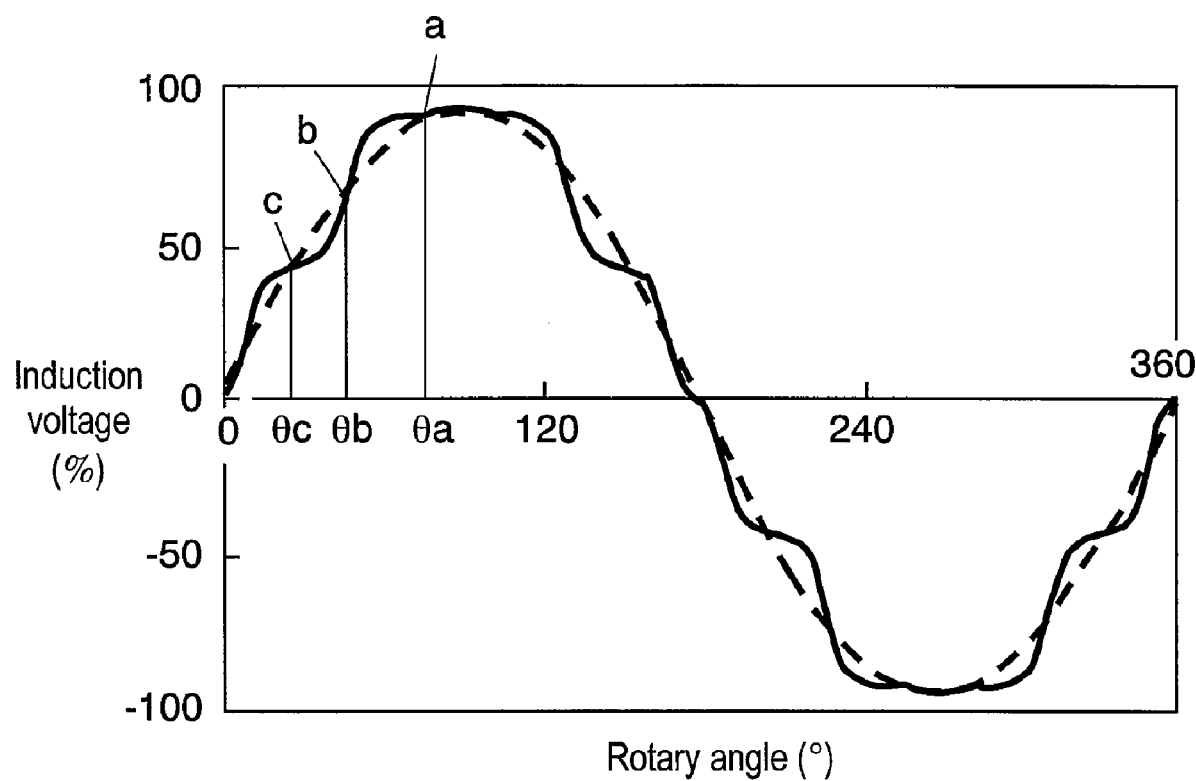
FIG. 9 shows a waveform of an induction voltage of the conventional motor.
Figure 10:
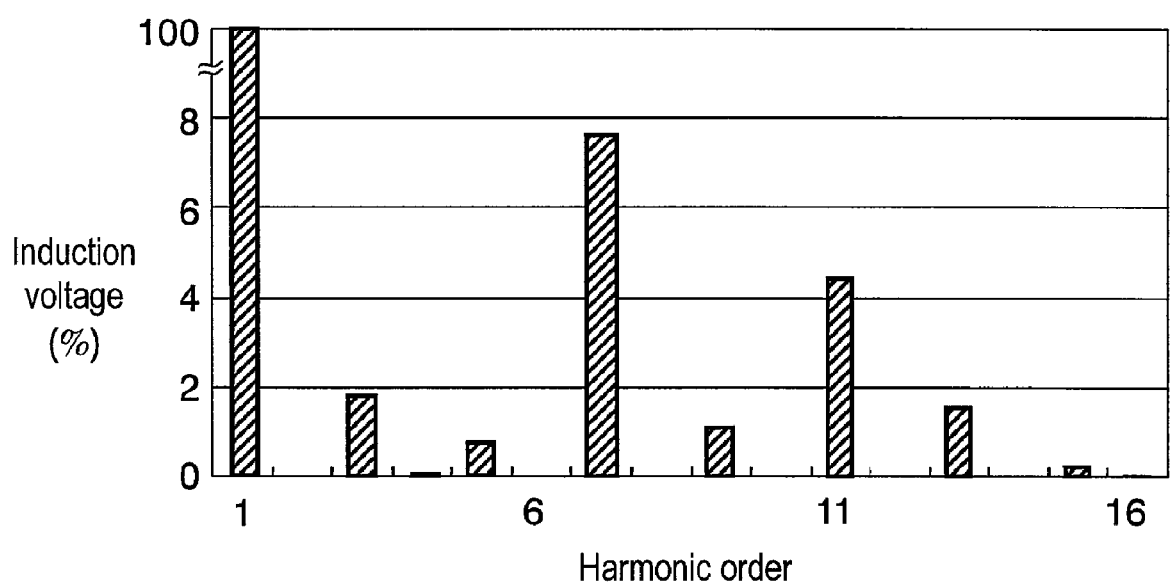
FIG. 10 shows an induction voltage at respective harmonics based on the analysis of actually measured values in FIG. 9.

A straight line angled at given angle "θa" from magnetic pole center line 27 toward magnetic boundary line 28 and extending through rotary center 20 crosses the external shape of rotor iron-core 23 at end point A. Then end point X is connected to end point A with an arc of which center is rotary center 20. This given angle "θa" falls within the range of 30°<θa<75° in electrical angles. This angle "θa" is somewhat greater than angle "θa" used in the first embodiment. This simplified external shape allows lowering the cogging torque and the harmonic content of the induction voltage as well. Angle "θa" used in embodiment 2 is measured at the mid point among the intersection points of the ideal waveform (broken line) and the induction voltage waveform (solid line) of the conventional rotor. These waveforms are shown in FIG. 9.

Next, the reason why angle "θa" included between line 27 and end point A is set falling within the range of 30°<θa<75° is described hereinafter with reference to FIG. 7, which shows a graph illustrating a relation between output torque, cogging torque and the external shape of the rotor. The X-axis represents a position of end point "A" at electrical angle 180° for one pole. The Y-axis represents a ratio of output torque vs. cogging torque at end point "A" assuming that output torque and cogging torque stand at 100 in the condition where the entire external circumference is a circle (end point "A" includes 90' in electrical angles).

Figure 7:
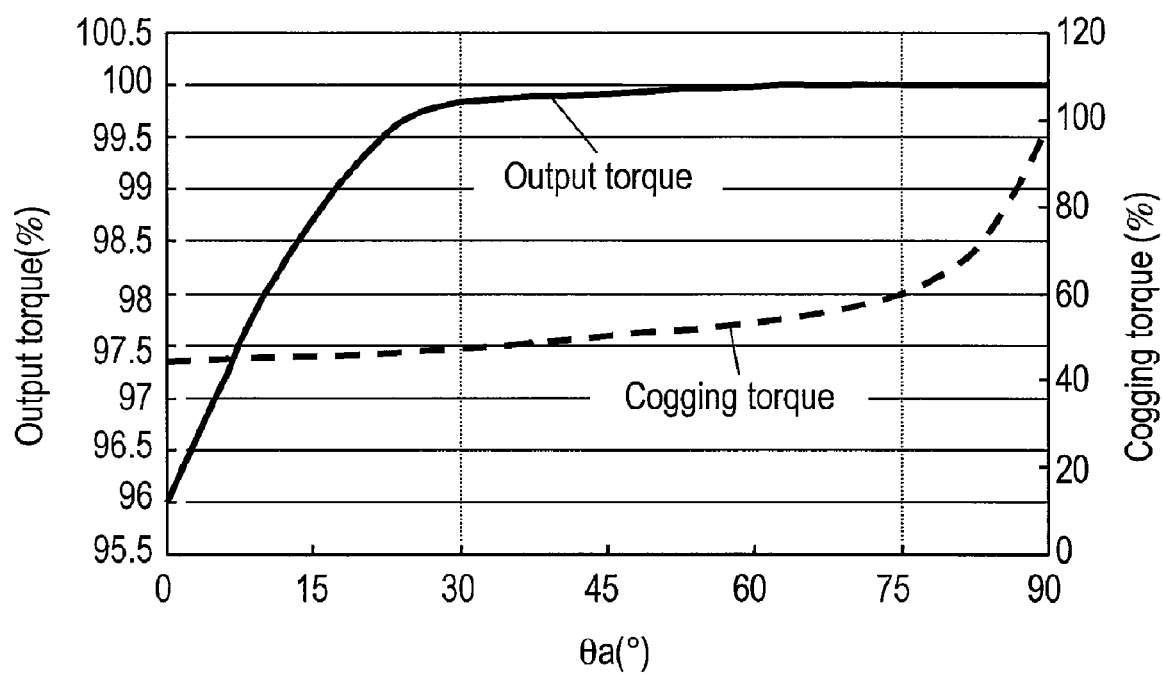
FIG. 7 shows a graph illustrating a relation between output torque, cogging torque and angle θa of the motor in accordance with the second embodiment of the present invention.
Figure 8:
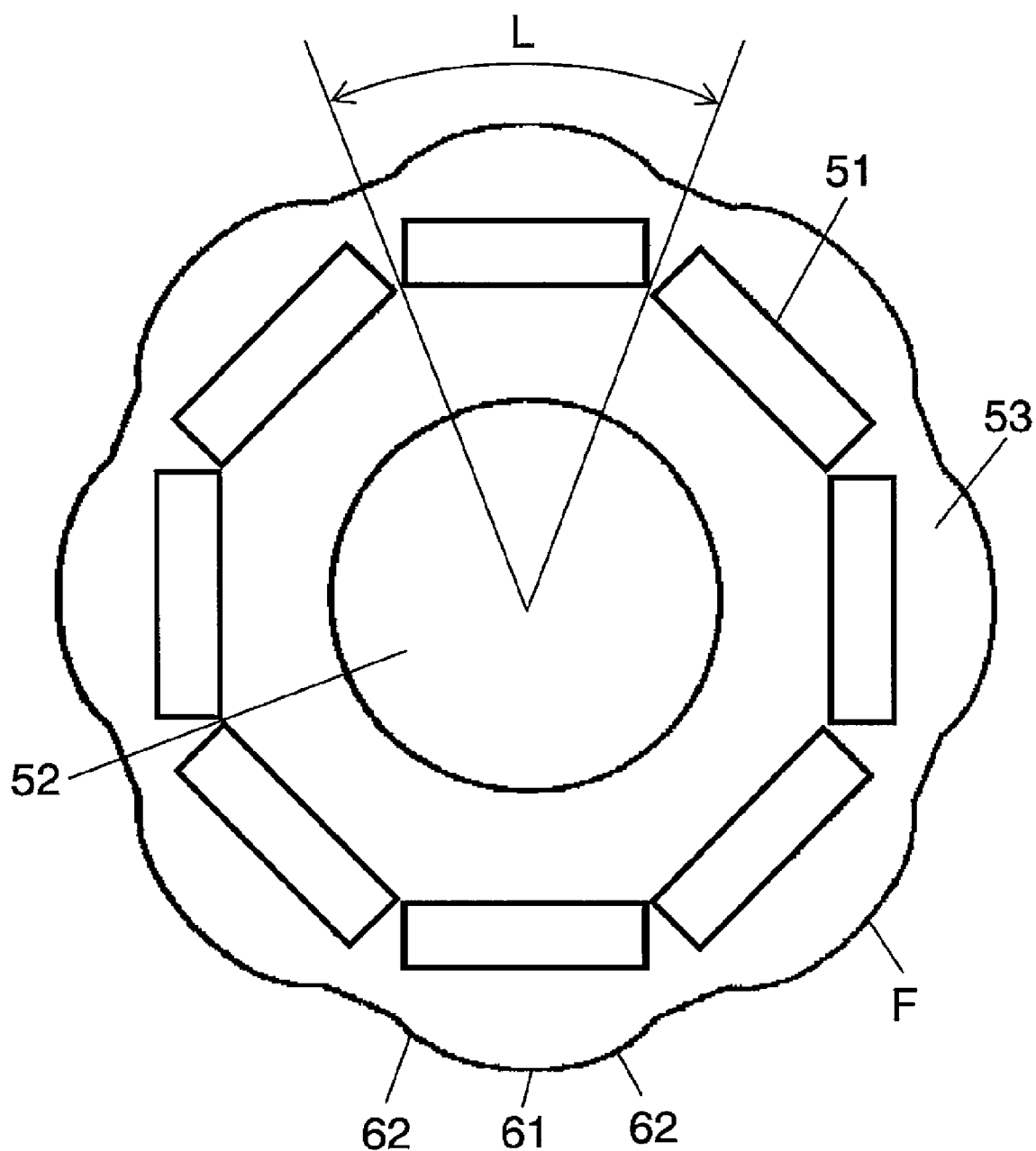
FIG. 8 shows a sectional view of a rotor of a conventional motor.

FIG. 7 tells that angle "θa" not greater than 30° reduces an amount of magnetic flux interlinking the coil, thereby lowering the output torque, and angle "θa" over 75° increases the cogging torque sharply. Thus angle "θa" included between magnetic centerline 27 and end point A desirably falls within the range of 30°<θa<75° in electrical angles.

The position of end point A can be changed in response to the shape of the end of magnet hole 22 so that the harmonic content of the induction voltage can be lowered.

This second embodiment proves that the cogging torque can be reduced from the prior art while the output torque maintained although the harmonic content of the induction voltage increases from the first embodiment.

What is claimed is:
1. A motor comprising:
  a stator including a stator iron-core formed of a salient iron-core and a yoke, and a winding wound on the stator iron-core; and
  a rotor facing an inner wall of the salient iron-core and held rotatably, the rotor including a rotor iron-core formed by laminating an iron sheet of high permeability,
  wherein the rotor iron-core includes a plurality of holes in which permanent magnets are to be buried, and the permanent magnets buried in the holes,
  wherein a magnetic pole centerline connecting a rotary center of the rotor to a magnetic pole center crosses an external shape of the rotor iron-core at end point X, and a magnetic-pole boundary line connecting the rotary center to a magnetic pole boundary point crosses the external shape of the rotor iron core at end point Z, and a straight line angled at a given angle "θa" from the magnetic pole centerline toward the magnetic boundary line and extending through the rotary center crosses the external shape of the rotor iron-core at end point A, wherein a sectional view of the rotor iron-core shows an arc drawn between end points X and A, and a center of the arc is the rotary center, and the end points A and Z are connected by at least one straight line, and the at least one straight line exists inside a circle drawn by an extension line of the arc at the same curvature, and wherein a minimum distance between an end of one of the plurality of holes and the external shape of the rotor iron-core is referred to as "Ln", and a thickness of the iron sheet of high permeability is referred to as "d", then a relation of d/2<Ln<2d is established.

2. The motor of claim 1, wherein each one of the plurality of holes includes a projection at both ends along a circumferential direction.

3. The motor of claim 1, wherein the given angle "θa" falls within a range of 15°<θa<75°, and the end point A is connected to the end point Z by a plurality of straight lines in series.

4. The motor of claim 3, wherein an intersection point of the plurality of straight lines in series forms a protrusion.

5. The motor of claim 3, wherein a minimum distance between an end of each one of the plurality of holes and the external shape of the rotor iron-core is referred to as "Ln", and an intersection point of the plurality of straight lines in series is changed in response to a value of "Ln".

6. The motor of claim 1, wherein the given angle "θa" falls within a range of 30°<θa<75°, and the end point A is connected to end point Z by one straight line.

7. The motor of claim 1, wherein the winding is wound in a concentrated manner.

8. A motor comprising:
a stator having an inner surface; and
a rotor having an outer surface facing the inner surface of the stator, the rotor including a rotor iron-core formed by laminating a plurality of iron sheets,
wherein the rotor iron-core includes a plurality of holes for receiving a plurality of permanent magnets, the permanent magnets forming magnetic poles,
wherein a first radial line across a center of one of the magnetic poles intersects the outer surface of the rotor at point X, a second radial line across a boundary of the one of the magnetic poles intersects the outer surface of the rotor at point Z, and a third radial line at a given angle "θa" from the first radial line intersects the outer surface of the rotor at point A,
wherein the outer surface of the rotor forms an arc between points X and A, and the outer surface of the rotor forms at least one straight line between points A and Z, and
wherein the plurality of iron sheets each have a thickness "d", and a minimum distance between an outermost end of each one of the plurality of holes and the outer surface of the rotor is "Ln", such that d/2<Ln<2d.

* * * * *